US010649075B2

United States Patent
Schuman et al.

(10) Patent No.: US 10,649,075 B2
(45) Date of Patent: May 12, 2020

(54) MULTIPLATFORM GMTI RADAR WITH ADAPTIVE CLUTTER SUPPRESSION

(71) Applicant: SRC, Inc., North Syracuse, NY (US)

(72) Inventors: Harvey K. Schuman, Fayetteville, NY (US); Ping G. Li, Elmhurst, NY (US)

(73) Assignee: SRC, Inc., North Syracuse, NY (US)

( * ) Notice: Subject to any disclaimer, the term of this patent is extended or adjusted under 35 U.S.C. 154(b) by 336 days.

(21) Appl. No.: 15/715,492

(22) Filed: Sep. 26, 2017

(65) Prior Publication Data

US 2018/0031690 A1     Feb. 1, 2018

Related U.S. Application Data

(63) Continuation of application No. 14/299,399, filed on Jun. 9, 2014, now Pat. No. 9,772,402.

(51) Int. Cl.

| | |
|---|---|
| *G01S 13/524* | (2006.01) |
| *G01S 13/00* | (2006.01) |
| *G01S 7/288* | (2006.01) |
| *G01S 13/87* | (2006.01) |
| *G01S 7/41* | (2006.01) |

(52) U.S. Cl.
CPC .......... *G01S 13/5244* (2013.01); *G01S 7/288* (2013.01); *G01S 7/414* (2013.01); *G01S 13/003* (2013.01); *G01S 13/87* (2013.01)

(58) Field of Classification Search
CPC .............................. G01S 13/5244; G01S 7/288
See application file for complete search history.

(56) References Cited

U.S. PATENT DOCUMENTS

| | | |
|---|---|---|
| 4,855,747 A | 8/1989 | Steinberg |
| 6,633,253 B2 | 10/2003 | Cataldo |
| 6,756,935 B1 | 6/2004 | Cameron et al. |
| 7,109,911 B1 | 9/2006 | Cataldo |
| 7,570,196 B1 | 8/2009 | Mower et al. |

(Continued)

OTHER PUBLICATIONS

Klemm. "Adaptive clutter suppression for airborne phased array radars" IEEE Proceedings on Microwaves, Optics and Antennas, 1983, 130 (1), 125-132.

(Continued)

*Primary Examiner* — Marcus E Windrich
(74) *Attorney, Agent, or Firm* — Bond Schoeneck & King, PLLC; George McGuire; Jonathan Gray

(57) ABSTRACT

The present invention is directed to a method for processing radar signals in a distributed array radar that includes a first airborne platform and at least one second airborne platform. Doppler filtered radar return samples are obtained and a weight value is calculated as a function of first clutter signals and second clutter signals. The weight value is employed in a weight vector that is computed, as well, from a steering vector that need not be matched to the target vector. The weight vector is applied to a signal vector corresponding to the Doppler filtered radar return samples. An open loop feedback is implemented and configured to create beam pattern nulls at angles corresponding to the plurality of first interference signals within each of the Doppler bins without substantially tracking a position or velocity of the first airborne platform or the at least one second airborne platform.

36 Claims, 7 Drawing Sheets

(56) References Cited

U.S. PATENT DOCUMENTS

| | | | |
|---|---|---|---|
| 7,911,372 B2* | 3/2011 | Nelson | G01S 13/003 |
| | | | 342/179 |
| 8,134,493 B2 | 3/2012 | Noble et al. | |
| 9,559,417 B1* | 1/2017 | Schwarzwalder | H04B 7/0456 |
| 9,638,793 B2* | 5/2017 | Wang | G01S 13/288 |
| 2003/0218565 A1* | 11/2003 | Budic | G01S 7/023 |
| | | | 342/90 |
| 2012/0249361 A1* | 10/2012 | Sahinoglu | G01S 7/292 |
| | | | 342/159 |
| 2014/0191900 A1* | 7/2014 | Uysal | G01S 13/9029 |
| | | | 342/25 B |
| 2014/0361919 A1* | 12/2014 | Pomerance | G01S 13/006 |
| | | | 342/27 |

OTHER PUBLICATIONS

Newman et al. "Synchronized GMTI radar collection management in a coalition environment" IEEE Proceedings of the Fifth International Conference on Information Fusion, 2002, 2, pp. 1046-1053.

Popp et al. "Multi-platform GMTI tracking for surveillance and reconnaissance coalition environments" IEEE Proceedings of the Aerospace Conference, 2001, 4, pp. 1925-1934.

Taheri et al. "Tolerances in self-cohering antenna arrays of arbitrary geometry" IEEE Transactions on Antennas and Propagation, 1976, 24 (5), pp. 733-739.

Kaplan, Michael and King, Cynthia, Space-Based Tethered Phased-Array Antenna, United States Statutory Invention Registration, Reg. No. H1383, Published Dec. 6, 1994, pp. 1-7.

* cited by examiner

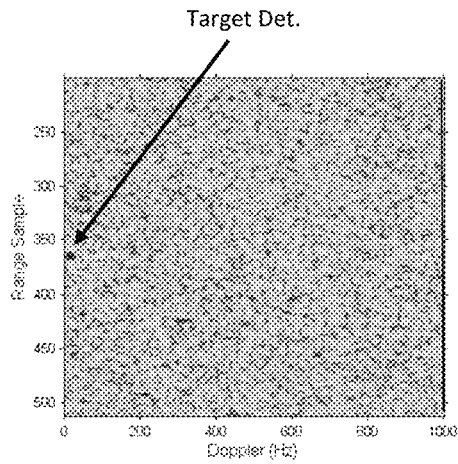 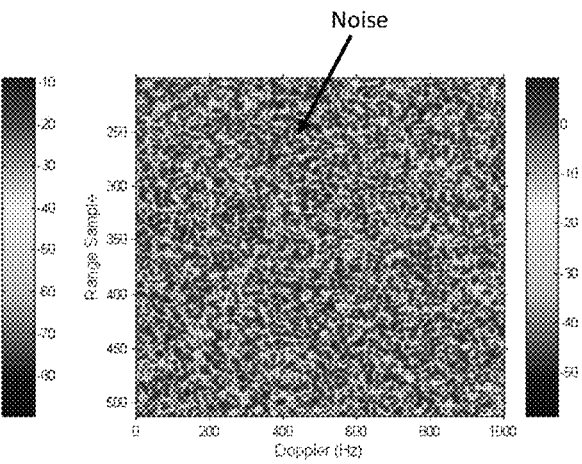
Fig. 1A  Fig. 1B
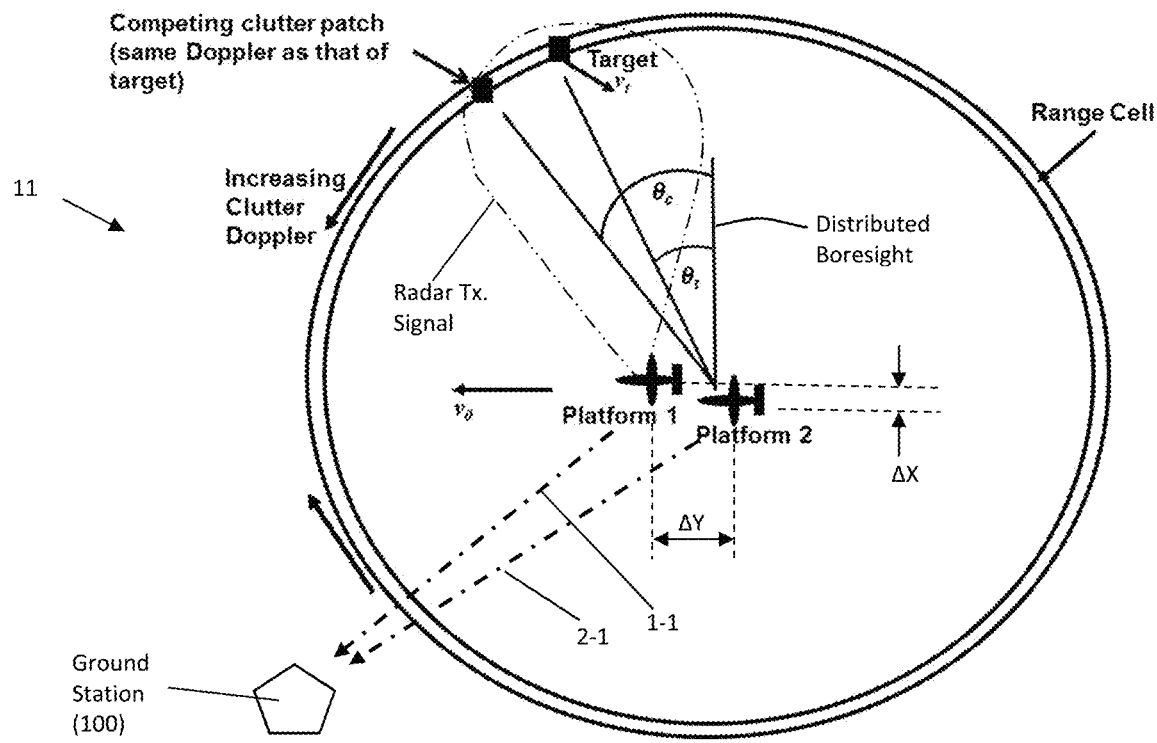
Fig. 2

MULTIPLATFORM GMTI RADAR WITH ADAPTIVE CLUTTER SUPPRESSION

GOVERNMENT RIGHTS

The invention was conceived or reduced to practice under U.S. Government Contract Name Cohering Multiplatform Sensors with Disposable Transponders; Contract No. F30602-02-C-0081, Project Number D0645. The US Government may have limited rights to practice the invention.

CROSS-REFERENCE TO RELATED APPLICATION

This application claims priority to pending U.S. patent application Ser. No. 14/299,399, filed on Jun. 9, 2014, and entitled "Multiplatform GMTI Radar With Adaptive Clutter Suppression," the entire disclosure of which is incorporated herein by reference.

BACKGROUND OF THE INVENTION

1. Field of the Invention

The present invention relates generally to radar processing systems, and particularly to Ground Moving Target Indicator (GMTI) radar with adaptive clutter suppression.

2. Technical Background

The term radar is an acronym that stands for "radio detection and ranging." A radar system transmits radio frequency (RF) signals in a predetermined direction (i.e., a bearing) with the intention of contacting or illuminating moving objects ("contacts"). When the transmitted radar signal illuminates a contact, a return signal is reflected back toward the radar receiver. The return signal is detected if it is stronger than any noise signals that may be present in the receiver. A contact's bearing corresponds to the direction of the transmitted radar signal. Because the signal travels at the speed of light, the distance, or "range", is determined by measuring the time between signal transmission and the reception of the return signal. Radar has proved to be a very useful tool that can detect contacts such as spacecraft, aircraft, vehicles, etc., within a predetermined region or search volume and provide the radar receiver with the contacts bearing, range, velocity, etc. This information provides military commanders, security personnel, or police with the intelligence they needed to properly assess their situational awareness. Moreover, radar systems are now being used in many different applications including civilian air traffic control, search and reconnaissance, weather forecasting and tracking, and automotive traffic control, to name a few. Another radar application that has been garnering a great deal of interest relates to ground moving target indication (GMTI).

GMTI is an important application for "look-down" (i.e., airborne and space based systems) radar systems. Because resources are limited, military commanders must use their assets smartly and efficiently. To do this, they require reliable intelligence in order to develop accurate "situation awareness" (SA). SA is about knowing where the enemy is, how big it is, where it is going and how fast it is getting there.

One of the drawbacks with GMTI radar relates to its ability (or inability) to distinguish slow-moving targets from background clutter. Clutter refers to the radar return signals that are reflected by terrain, buildings, trees and other such objects that are not of interest to the decision makers. GMTI radars use the Doppler Effect to distinguish moving contacts from stationary ones. (When a contact approaches the radar receiver, its velocity component parallel to the line of sight of the radar imparts a positive frequency shift if moving towards the radar, and a negative frequency shift if moving away from the radar. This frequency shift is referred to as Doppler and the relevant velocity component is the Doppler velocity. The use of Doppler radar provides a widely used means for distinguishing a target contact from stationary background (clutter). The Doppler frequency is calculated by calculating the ratio of twice the relative velocity over the wavelength of the radar signal (i.e., $F_D=(2)(V_R)/\lambda$). (This expression assumes a monostatic radar wherein the transmitter and receiver are collocated. In bistatic radar, the expression is modified to account for the differing velocity vector orientation with respect to the transmitter and receiver.) When a radar platform is moving (e.g., it is mounted on an aircraft), however, clutter returns at different angles will appear to move at different velocities and thus impart a spread of Doppler frequencies that can mask a moving target. By filtering both in angle and in Doppler, the radar processor can distinguish between clutter and target unless the target is moving too slowly. In this case, the competing clutter will arise from nearly the same angle as that of the target. This gives rise to the notion of "minimum detectable velocity (MDV)." Briefly stated, if the target is below the radar's MDV it will not be detected; on the other hand, if a contact's Doppler velocity is above the radar's MDV, the GMTI radar can detect the contact.

A limiting factor of GMTI radar arises from the fact that the MDV is primarily limited by the electrical size of the radar antenna aperture; sharper angle filtering requires a larger antenna aperture. The MDV is inversely related to the electrical size of the radar antenna aperture. Thus, the MDV is reduced by increasing the electrical size of the radar antenna aperture. However, since the GMTI radar (and its antenna) is part of the aircraft's payload, the size of the antenna aperture is strictly limited by the size of the aircraft platform itself. What is needed therefore is a way to increase the electrical size of the radar antenna aperture without the physical constraints outlined above.

In one approach that was considered, additional antenna elements were mounted on stationary, distributed platforms. The antennas were widely separated spatially to increase the electrical size of the overall radar antenna aperture. Since the radar processor knew the precise position of each platform's antenna phase center, it also knew a priori what the phase offsets were between antennas. In other words, because the platforms were stationary, the computational burden placed on the processor was significantly reduced, making the system feasible. One obvious drawback to this approach relates to the fact that the system is immobile during usage.

Thus, a major drawback to mobile multiplatform GMTI radar relates to the fact that the relative positions of the platform antenna phase centers must be tracked to a small fraction of a wavelength. Conventional proposals to solve this ambiguity problem, and other problems associated with mobile distributed array multiplatform radar, make the assumption that the array phase centers can be precision tracked to fractions of a wavelength by some means, or that the array can be cohered by focusing on strong scatterers, transponders, and so forth. Such tracking accuracies are very difficult, if not impossible, to achieve with moving platforms at radar frequencies.

What is needed, therefore, is a GMTI radar that can detect ground moving targets with very small minimum detectable velocities by combining signals in a clutter suppressing space-time (angle-Doppler) adaptive processing (STAP) filter without requiring that the relative positions of the antenna phase centers be accurately tracked. As those skilled in the art will appreciate, STAP filters adaptively (automatically) combine temporal and spatial data to produce a null at angles corresponding to clutter and other interference, while simultaneously producing gain at the angles and Doppler frequency of the targets.

FIG. 1A shows the range-Doppler response map for a conventional multichannel GMTI radar system that employs STAP. The target is clearly detected at a range cell of about 370, and exhibits a Doppler frequency that is close to 15 Hz. In this case, the low Doppler frequency indicates that the target has a relatively low MDV. FIG. 1B shows the radar performance in the presence of noise and without STAP. This Figure illustrates the impact that clutter and other types of interference can have on the radar detection process, namely, that the radar cannot detect the target without such adaptive processing. These drawing Figures highlight the need for a technique that can successfully overcome the phase center ambiguity problem and implement mobile multi-platform GMTI radars using adaptive processing such as STAP.

What is needed is a multiplatform GMTI radar (thus large aperture) with adaptive clutter suppression. What is further needed is a simple means of handling the phase center ambiguity of mobile multiplatform radar.

SUMMARY OF THE INVENTION

The present invention addresses the needs described above by providing a multiplatform GMTI radar with adaptive clutter suppression that is configured to increase the electrical size of the radar antenna aperture using a distributed antenna array via multiple mobile platforms. The present invention substantially reduces the MDV by making the effective electrical aperture very large. This is accomplished by combining two or more mobile radars (disposed on separate ground vehicle, airborne or spaceborne platforms) so that they function as one. The associated large aperture allows cancellation of mainlobe clutter without suffering severe target-gain loss. Most importantly the multiplatform GMTI radar of the present invention is configured to detect ground moving targets with very small minimum detectable velocities without requiring that the relative positions of the antenna phase centers be accurately tracked.

One aspect of the present invention is directed to a radar system that includes a data input portion having a first channel configured to receive first radar return samples from a first GMTI radar receiver disposed on a first mobile platform and at least one second channel configured to receive second radar return samples from at least one auxiliary GMTI radar receiver disposed on at least one second mobile platform. The first mobile platform and the at least one second mobile platform define a distributed array. The first radar return samples and the second radar return samples correspond to radar return signals originating from a radar transmitter. A non-adaptive processing portion is coupled to the data input portion. The non-adaptive portion is configured to derive Doppler filtered radar return samples that include a plurality of first clutter signals from the first radar return samples, a plurality of second clutter signals from the second radar return samples and a target signal. The plurality of second clutter signals are characterized by at least one phase delay relative to the plurality of first clutter signals. An adaptive processing portion is coupled to the non-adaptive processing portion. The adaptive weight determination processor is configured to calculate a weight value as a function of the plurality of first clutter signals and the plurality of second clutter signals but not the phase delay. The weight value is employed in a weight vector for a space-time adaptive processing (STAP) filter that applies the weight vector to a signal vector corresponding to the Doppler filtered radar return samples. The STAP filter implements an open loop feedback configured to create beam pattern nulls at angles corresponding to the plurality of first interference signals within each of the Doppler bins without substantially tracking a position or velocity of the first airborne platform or the at least one second airborne platform.

In one embodiment, the first mobile platform and the at least one second mobile platforms include an airborne platform or spaceborne platform.

In another embodiment, the at least one second airborne platform includes a plurality of second airborne platforms and the at least one auxiliary GMTI radar receiver includes a plurality of GMTI radar receivers.

In yet another embodiment, the data input portion is disposed on either the first platform or the at least one second platform.

In yet another embodiment, the non-adaptive processing portion and the adaptive processing portion are disposed at a location remote from the data input portion, and wherein the data input portion provides the first coherent radar return samples and the second radar return samples via a data link.

In yet another embodiment, the data input portion, the non-adaptive processing portion and the adaptive processing portion are disposed at a location remote from the first GMTI radar receiver or the at least one auxiliary GMTI radar receiver, and wherein the first coherent radar return samples and the second radar return samples are provided to the data input portion via a data link.

In yet another embodiment, the radar transmitter is configured as a monostatic radar transmitter or as a bistatic radar transmitter.

In one version, the bistatic radar transmitter is disposed aboard a separate and remote airborne or spaceborne platform.

In yet another embodiment, the clutter signal is substantially equal to $y(\theta_c) = x_1(\theta_c) + w^* x_2(\theta_c)$, where $x_1(\theta_c)$ and $x_2(\theta_c)$ are the plurality of first clutter signals and the plurality of second clutter signals, respectively, and $\theta_c$ denotes the angle of a clutter direction vector relative to the distributed array boresight, and wherein $w^*$ is the complex conjugate of the complex weight w that maintains target signal strength while minimizing the mean square value of the clutter signal.

In yet another embodiment, the target signal in a linear combination of the first channel and the at least one second channel is given by:

$$y(\theta_t) = e_t f_1(\theta_t) + n_1 + w^*(e_t \exp(j\psi_t) f_2(\theta_t) + n_2),$$

wherein $e_t$ is a complex target spectral component, $f_1(\theta_t)$ and $f_2(\theta_t)$ are the complex antenna patterns of the first GMTI radar receiver and the at least one second GMTI radar receiver, respectively, and wherein $e_t [\exp(j\psi_t)]$ is a complex target spectral component including the phase delay between the first GMTI radar receiver and the at least one second GMTI radar receiver, and wherein $n_1$ and $n_2$ are the first GMTI radar receiver noise and the at least one second GMTI radar receiver noise, respectively.

In yet another embodiment, the complex weight is a mean square average given by: $w=-\overline{|x_1^*(\theta_c)|^2/|x_2^*(\theta_c)|^2}$ wherein $x_1^*(\theta_c)$ and $x_2^*(\theta_c)$ are the complex conjugates of $x_1(\theta_c)$ and $x_2(\theta_c)$ respectively.

In yet another embodiment, wherein the complex weight w is a covariance matrix given by: $w=R^{-1}s$, where R denotes the interference plus noise covariance matrix and s denotes the steering vector.

In yet another embodiment, the adaptive processing portion provides an output signal, the output signal being given by: $y=w^H x$ where x denotes the data vector corresponding to the range cell under test for a target.

In yet another embodiment, the relative position or the relative velocity of the first airborne platform or the at least one second airborne platform are known approximately only to within a few range cells and Doppler bins from navigation data.

In another aspect, the present invention is directed to a method for processing radar signals in a distributed array radar that includes a first GMTI radar receiver disposed on a first airborne platform and at least one auxiliary GMTI radar receiver disposed on at least one second airborne platform. The first airborne platform and the at least one second airborne platform define a distributed array. The method includes the step of obtaining Doppler filtered radar return samples that include a plurality of first clutter signals (including receiver noise) from the first radar return samples, a plurality of second clutter signals from the second radar return samples and a target signal. The plurality of second clutter signals are characterized by at least one phase delay relative to the plurality of first clutter signals. A weight value is calculated as a function of the plurality of first clutter signals and the plurality of second clutter signals but not the phase delay. (The phase delay is implicit in the clutter signals.) The weight value being employed in a weight vector for a space-time adaptive processing (STAP) filter. The weight vector is applied to a signal vector corresponding to the Doppler filtered radar return samples. An open loop feedback is implemented and configured to create beam pattern nulls at angles corresponding to the plurality of first interference signals within each of the Doppler bins without substantially tracking a position or velocity of the first airborne platform or the at least one second airborne platform.

In one embodiment, the method includes the steps of: identifying a target characterized by the target range and the target velocity relative to the first airborne platform and the target angle relative to the distributed array; and receiving the first radar return samples from the first GMTI radar receiver and the second radar return samples from the at least one auxiliary GMTI radar receiver, the first radar return samples and the second radar return samples corresponding to radar return signals originating from one radar transmitter.

In another embodiment, the radar transmitter is configured as a monostatic radar transmitter or as a bistatic radar transmitter.

In yet another embodiment, the clutter signal is substantially equal to $y(\theta_c)=x_1(\theta_c)+w^*x_2(\theta_c)$, where $x_1(\theta_c)$ and $x_2(\theta_c)$ are the plurality of first clutter signals and the plurality of second clutter signals, respectively, and $\theta_c$ denotes the angle of a clutter direction vector relative to the distributed array boresight, and wherein $w^*$ is the complex conjugate of the complex weight that maintains target signal strength while minimizing the mean square value of the clutter voltage.

In one version, the target signal in a linear combining of the first channel and the at least one second channel is given by:

$$y(\theta_t)=e_t f_1(\theta_t)+n_1+w^*(e_t \exp(j\psi_t)f_2(\theta_t)+n_2),$$

wherein $e_t$ is a complex target spectral component, $f_1(\theta_t)$ and $f_2(\theta_t)$ are the complex antenna patterns of the first GMTI radar receiver and the at least one second GMTI radar receiver, respectively, and wherein $e_t [\exp(j\psi_t)]$ is a complex target spectral component including the phase delay between the first GMTI radar receiver and the at least one second GMTI radar receiver, and wherein $n_1$ and $n_2$ are the first GMTI radar receiver noise and the at least one second GMTI radar receiver noise, respectively In another version, the complex weight is a mean square average given by: $w=-\overline{|x_1^*(\theta_c)|^2/|x_2^*(\theta_c)|^2}$, wherein $x_1^*(\theta_c)$ and $x_2^*(\theta_c)$ are the complex conjugates of $x_1(\theta_c)$ and $x_2(\theta_c)$, respectively.

In yet another version, the mean square average is approximated by collecting several range cells of the plurality of first clutter signals and the plurality of second clutter signals.

In yet another version, the wherein the complex weight is a covariance matrix given by: $w=R^{-1}s$, where R denotes the interference plus noise covariance matrix and s the steering vector.

In yet another version, the method further comprises the step of providing an output signal, the output signal being given by: $y=w^H x$.

In yet another version, a relative position or a relative velocity of the first airborne platform or the at least one second airborne platform are known to within a few range cells and Doppler bins from navigation data.

In yet another version, the application of the weight vector w to a signal vector automatically coheres the plurality of first clutter signals and the plurality of second clutter signals to substantially cancel the plurality of first clutter signals and the plurality of second clutter signals and maintain the target signal strength.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

It should also be understood that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

FIGS. 1A-1B are range-Doppler response maps for a conventional multichannel GMTI radar system with and without STAP;

FIG. 2 is a diagram illustrating the geometry of the multiplatform environment of the present invention;

DETAILED DESCRIPTION

Figure 5:
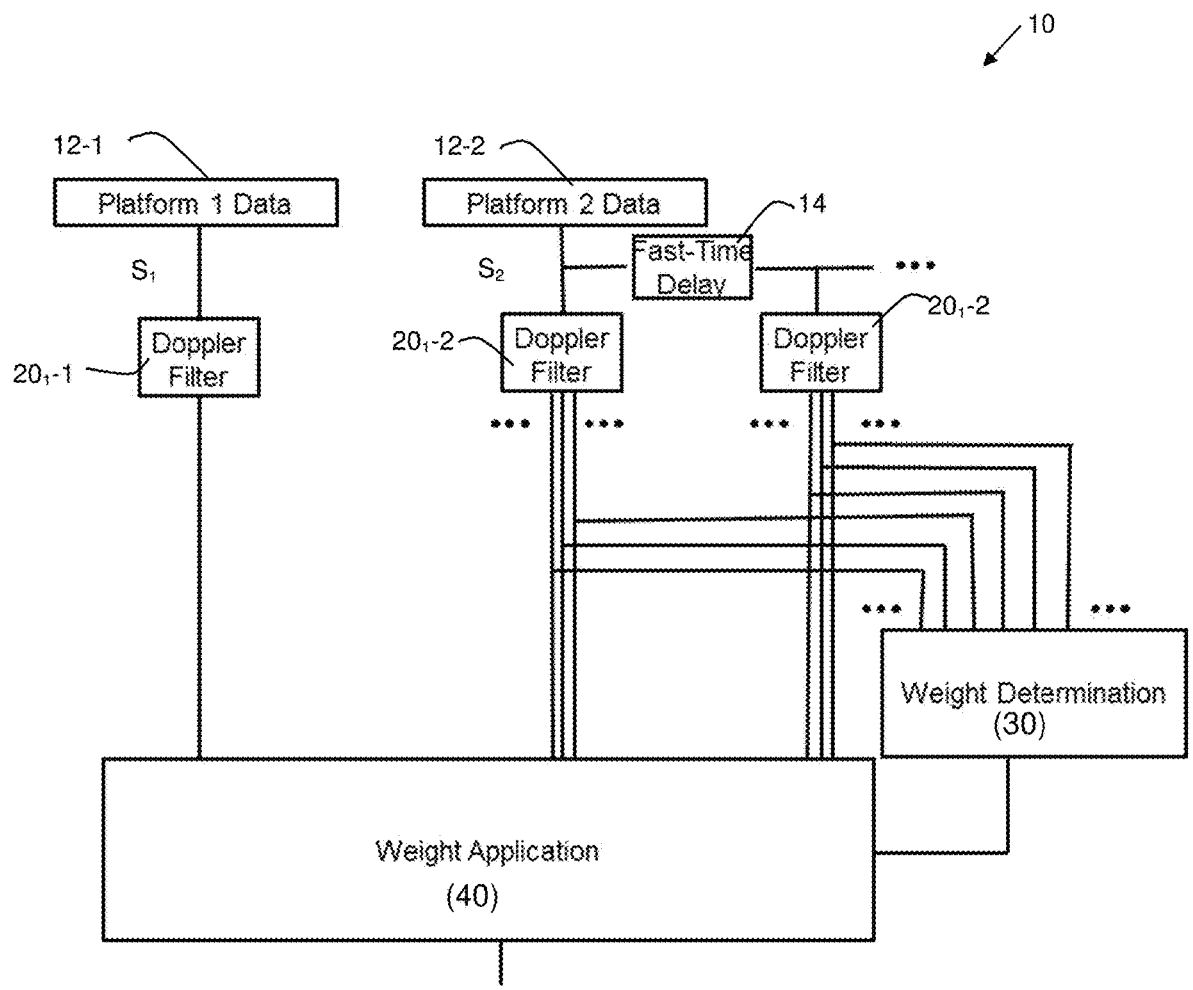
FIG. 5 is a block diagram of signal processing elements in accordance with the present invention when the relative platform location and velocity uncertainties are on the orders of range cells and/or Doppler bins.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIG. 5, and is designated generally throughout by reference numeral 10.

Referring to FIG. 2, a diagram illustrating the geometry of the multiplatform environment 11 is disclosed. Two aircraft (platform 1 and platform 2) are shown at the center of the drawing. As the drawing indicates, the radial velocity $v_o$ of the clutter is at a positive maximum in the direction that the platforms are traveling and negative minimum in the opposite direction. The radial absolute velocity is at a minimum amidships. The Doppler frequency of the clutter also is at a positive maximum in the direction of travel and at a negative minimum directly behind the aircraft tails.

For ease of illustration, only two aircraft "platforms" are considered in this view and the radar system aboard each plane employs only one channel, although the method of the present invention can be readily extended to any number of platforms flying in loose formation and any number of channels on each platform. The platforms further are assumed to move at roughly the same velocity in approximately the same direction during the data capture of one coherent processing interval (CPI), and the antenna arrays are assumed to be roughly parallel. With the following caveat, the platforms can otherwise be arbitrarily located with respect to one another. The caveats are: the cross range dimension ($\Delta Y$) should be limited to a relatively few wavelengths (e.g., 5-20$\lambda$); and the potential target range should be at least several times the platform altitude for the best results. When the platforms are spaced in this manner, overly narrow grating lobes that may fill in due to internal clutter motion and uncompensated platform acceleration are avoided. Note that the down range separation dimension ($\Delta X$) and the altitude separation of the two platforms are not substantially constrained.

Platform 1 is shown transmitting a radar signal that illuminates a target and a competing patch of clutter disposed in the same range cell. Both platforms receive the radar return signals, and data received by the platforms is transferred to one "master" platform, or a remote ground station 100, for Space-Time Adaptive Processing (STAP). In another embodiment of the present invention, one of the platforms 1 or 2 can be configured to perform the STAP. The STAP can include intraplatform channels as well as interplatform channels. The interplatform channels enable detection of very slow moving targets; the intraplatform channels enable detection of faster moving targets. As shown herein, multiplatform GMTI in accordance with the present invention can provide an order-of-magnitude or more reduction in MDV over that of single platform GMTI, and without the need to precisely navigate the platforms.

The present invention is shown herein as being configured as a monostatic radar, where one of the platform radars transmits the radar signal and all of the radars in the distributed array receive the return signals. Alternatively, the present invention may be configured as a bistatic radar wherein the radar transmitter is disposed aboard a separate and remote (airborne or space based) platform. As before, all of the radars in the distributed array receive the return signals.

Figure 3:
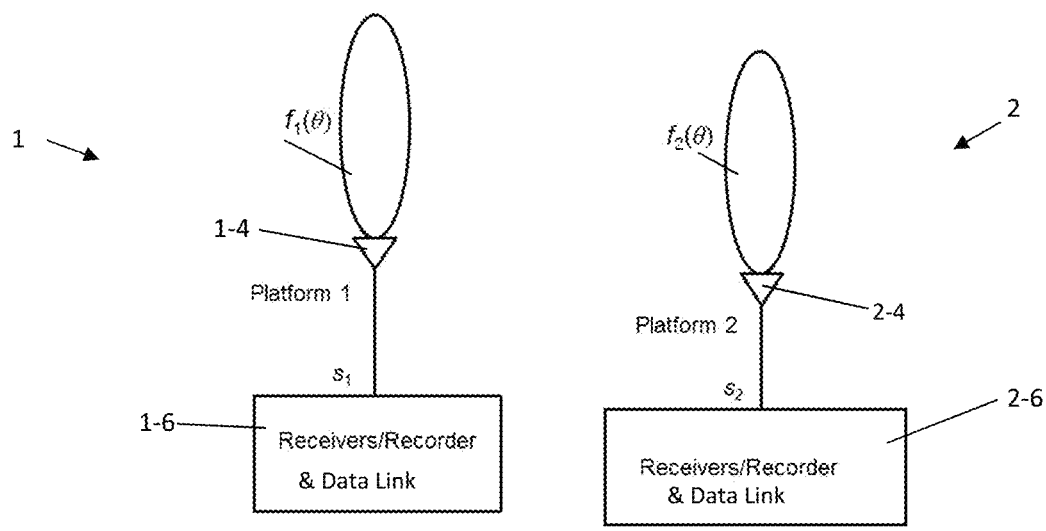
FIG. 3 is a diagram of the antennae and receivers of the platforms depicted in FIG. 2.

Referring to FIG. 3, a diagram of the antennae and receivers of the platforms depicted in FIG. 2 is disclosed. The antennas are configured to sense patterns $f_1(\theta)$ and $f_2(\theta)$ which can be different in this application. The platforms (1, 2) can fly reasonably offset in altitude and/or down range for maintaining safe flying separation. The data ($s_1$, $s_2$) is time stamped, saved in memory, and transmitted to a ground station 100 for real-time processing (See, FIG. 2) and is thus available for display. Alternatively, one of the platforms (1, 2) may be configured as a master platform that functions as the center of tactical operations.

Figure 4:
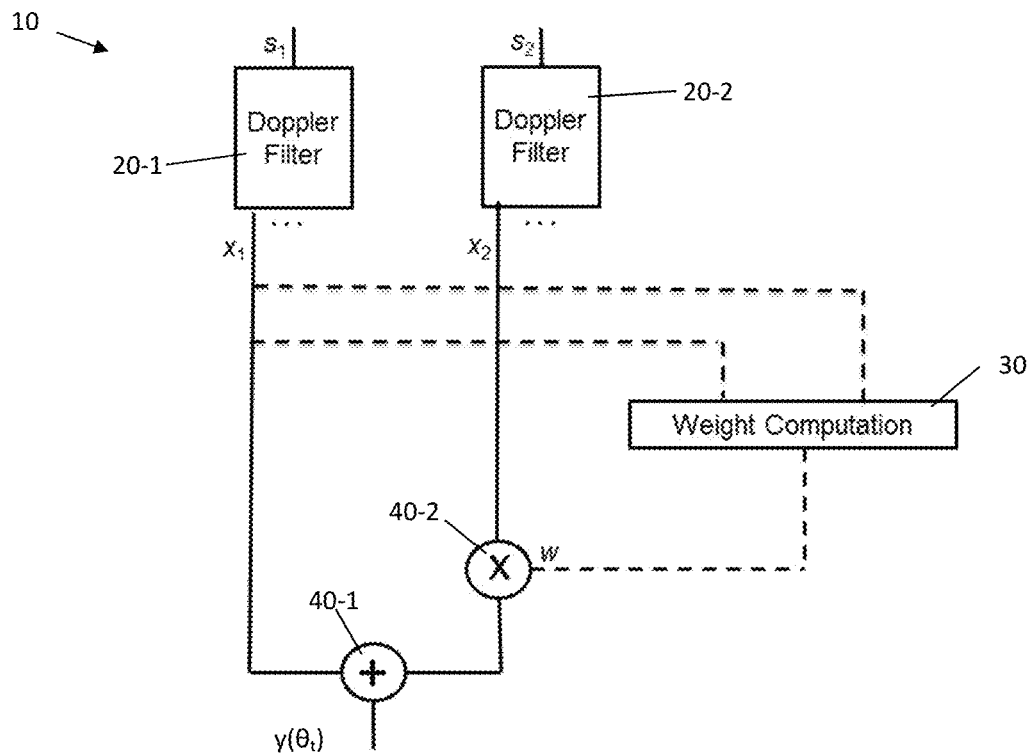
FIG. 4 is a block diagram of the signal processing elements in accordance with the present invention when the relative platform locations and velocities are substantially within a range cell and/or Doppler bin.

As embodied herein and depicted in FIG. 4, a block diagram of the signal processing elements in accordance with the present invention when the relative platform locations and velocities are known to substantially within a range cell and Doppler bin is disclosed. This embodiment does not otherwise require accurate tracking of the relative platform locations and velocities to within a wavelength or small velocity. The system 10 includes a Doppler filter 20-1 and Doppler filter 20-2 that are configured to receive the data outputs $S_1$ and $S_2$, from their respective platforms 1 and 2. The Doppler filters (20-1, 20-2) are configured to output clutter signals ($x_1$, $x_2$) that are confined to a relatively small angular spread (See, FIG. 2) due to the well-known correlation of Doppler and angle for airborne (or otherwise moving platform) radar. The Doppler filtered signals ($x_1$, $x_2$) are processed by the weight computation processor 30 in the following manner. The linear combination of the Doppler filtered Channels 1 and 2 results in a clutter signal, $y(\theta_c)$ given by:

$$y(\theta_c) = x_1(\theta_c) + w^* x_2(\theta_c) \quad (1)$$

$$y(\theta_t) = e_t f_1(\theta_t) + n_1 + w^*(e_t \exp(j\psi_t) f_2(\theta_t) + n_2) \quad (2)$$

Where $$x_1(\theta_c) = e_c f_1(\theta_c) + n_1 \quad (3)$$

$$x_2(\theta_c) = e_c \exp(j\psi_c) f_2(\theta_c) + n_2 \quad (4)$$

$e_c$=complex clutter spectral component
$f_1$=antenna 1 complex antenna pattern
$f_2$=antenna 2 complex antenna pattern
$n_1$=channel 1 receiver noise
$n_2$=channel 2 receiver noise
And, $$\psi_c = 2\pi S \sin(\theta_c) \quad (5)$$

For simplicity, assume that the platforms are at nearly the same altitude. The term $\psi_c$ denotes the phase corresponding to the delay of the clutter signal between the two channels, S denotes the distance between phase centers of antennas 1 and 2, and $\theta_c$ denotes the angle of the direction vector from the normal to the line between antennas in the plane formed by the clutter direction vector and that line. In addition, the factor w denotes the complex weight that must be determined and applied to best suppress the clutter and maintain target signal strength. The asterisk denotes complex conjugate and thus $w^*$ is the complex conjugate of the complex weight w.

The target signal arrives in a corresponding plane at angle $\theta_t$ with respect to the normal to the line between antennas in the plane containing the target direction vector (See, FIG. 2). The target signal in the linear combination of the two channels (Channel 1 and 2) is given by:

$$y(\theta_t) = e_t f_1(\theta_t) + n_1 + w^*(e_t \exp(j\psi_t) f_2(\theta_t) + n_2) \quad (6)$$

The second channel functions as a type of coherent canceller. Reference is made to U.S. Pat. No. 3,202,990, which is incorporated herein by reference as though fully set forth in its entirety for an example of a coherent canceler. The '990 patent focused on spatial (angle) nulling of interference located in the sidelobe of the "main" antenna and was implemented via closed loop analog circuitry. While the present invention treats channel 2 as a coherent canceller, it improves and expands on this concept by nulling clutter in both space and time (STAP), and via digital open loop processing. FIG. 4 depicts the essential components of one such architecture, what is referred to herein as a post Doppler STAP method. In this embodiment, the weight w is determined so as to minimize the interference (clutter) power confined to a Doppler bin. The interference voltage is given by Equations (1) or (2). For relatively large power ratios of clutter to noise, the weight that minimizes the mean square of the clutter voltage is, from (2), given by $$w = -\frac{f_1^*(\theta_c)}{f_2^*(\theta_c)} \exp(j\Psi_c) \quad (7)$$

Fortunately, the present invention eliminates the need to determine the quantities of this expression explicitly, especially the phase $\psi_c$ which is dependent on the relative positions and velocities of the platforms, in order to determine w. Instead, the weight w can be determined directly from Equation (1) using a post Doppler STAP method. Specifically, the weight w that minimizes the mean square clutter voltage while maintaining gain on target is computed to be:

$$w = -\overline{|x_1^*(\theta_c)|^2/|x_2^*(\theta_c)|^2} \quad (8)$$

where the overhead bar denotes average or expectation. Note that the platform relative positions and velocities do not need to be precisely tracked. The averaging in the above equation is approximated by collecting and averaging over several range cells of interference data. By applying the essential coherent cancellation inherent in equation (8), the problems and drawbacks associated with having to determine the phase $\psi_c$ accurately enough are eliminated. Moreover, the procedure employed by the present invention to determine the weight w is substantially simplified relative to conventional STAP procedures.

To be clear, the present invention differs from conventional STAP in several respects. First note that the '990 patent, and subsequent digital variants, pertained to stationary systems designed to counter sidelobe jamming interference. The '990 patent applies to a "sidelobe canceller" wherein the second channel is an auxiliary channel with lower gain than that of the first "main" channel. The second channel of the present invention (designated Channel 2 or "aux" channel) must contain gain comparable to that of the first channel (designated Channel 1 or "main" channel) because the clutter interference that normally would mask a slow moving target occurs within the antenna main lobe of Channel 1. Second, the present invention introduces multiple moving platforms that provide the large aperture needed for precise clutter cancellation within the main lobe while maintaining sufficient gain on target. This introduction of multiple moving platforms enables easily forming large apertures that are essential to obtaining small MDVs. Finally, the blind Doppler velocities normally resulting from such main lobe cancellation are dealt with naturally by allowing the spacing between the platforms to vary over time. A blind Doppler zone masking a target during one CPI may then shift away from the target during another CPI thus unmasking the target.

The method can be implemented monostatically with a transmitter on one of the receive platforms, or bistatically with a transmitter on a remote platform. The simple "one degree of freedom" processor (FIG. 4) is adequate if the platforms are tracked in relative position and velocity to a small fraction of a range cell and a small fraction of a Doppler bin. Otherwise the STAP processor can be extended by introducing fast-time taps spaced about a half range cell or so and several adjacent Doppler bins, as depicted in FIG. 5. The aforementioned equation for the weight becomes a matrix equation with which to solve for a weight vector in typical STAP fashion as follows.

Consider a STAP data vector x (denoting a column matrix). Each element of the data vector x is a sample of the signal from the output of a Doppler filter associated with one of the time delays and one of the antennas. The number of elements identifies the number of degrees of freedom (DOFs) of the STAP process. These DOFs are functions of "space" (antennas or subarrays), "slow time" (Doppler bins), and "fast time" (time delay taps). The subarrays (or beams) and PRIs (or Doppler bins) employed comprise the STAP spatial and temporal DOFs. In our implementation, the number of STAP DOFs is one plus the product of the number of Doppler frequencies, the number of time delay taps, and one less than the number of subarrays. The size of the data vector (and the order of the filter) is equal to the number of DOFs. Often, pulse compression precedes STAP, in which case a distinct data vector is formed for each range cell. In the ensuing discussion, there is a one-to-one relationship between DOFs and "channels."

The elements of the data vector x are samples of a signal containing interference, noise, and possibly the target. If the optimal filter were known, it could be applied to the elements of a data vector to yield an output signal that exhibits maximum ratio of average target signal power to interference plus noise power (SINR). The optimal filter is a linear filter of weight vector given by:

$$w = R^{-1}s \qquad (9)$$

where R denotes the interference plus noise covariance matrix and s the steering vector. R equals the expectation of the outer product of the conjugated interference plus noise data vector with the unconjugated interference plus noise data vector. The steering vector s typically is chosen to match the expected target relative amplitudes and phases within the channels for the Doppler bin under test for a target. In the present invention, the optimum steering vectors is not known entirely because the relative positions and velocities of the platforms are not accurately known. Thus the weights will not be those that maximize SINR, but, an appropriate approximate steering vector s. Specifically, the approximate steering vector s includes the expected target voltages for the platform 1 channels, and zeroes (0) for the channels of the other platforms. Thus, the approximate steering vectors of the present invention provides a weight vector w that more than adequately suppresses the interference (clutter and other interference such as jamming) while limiting the target signal to noise ratio to that of the signals of Platform 1 only. In a two platform arrangement, for example, the SINR will be about 3 dB less if the steering vectors is mismatched than if it were matched to the target.

Also, the present invention does not require an exact determination of the covariance matrix. Instead, the present invention typically estimates the covariance matrix from range cells other than the cell under test for a target and immediate neighboring cells (guard cells) in a post compression STAP embodiment. In a precompression STAP embodiment, the covariance matrix can be estimated from all data samples. This general technique is referred to as Sample Matrix Inversion (SMI). The estimate of R is given by:

$$R' = \frac{1}{K}\sum_{k=1}^{K} x_k x_k^H \qquad (10)$$

for K data vectors. The subscript, k, denotes the $k^{th}$ range cell data vector. This data dependent estimation is the feature that makes STAP adaptive. The STAP filter thus adapts to the interference. The weight vector normalized for cell averaging CFAR is then given by $$w = \frac{1}{\sqrt{s^H Rt^{-2}s}} Rt^{-1}s \qquad (11)$$

And the output signal is given by $$y = w^H x \qquad (12)$$

for a data vector, x, under test.

A commonly applied detection statistic (that is, a value computed and compared with a threshold; if the value exceeds the threshold a detection is declared) is given by:

$$|y|^2 = \frac{|\mathfrak{s}^H Rt^{-1}x|^2}{\mathfrak{s}^H Rt^{-1}s} \qquad (13)$$

A unique filter usually is determined for each compressed range cell and each Doppler bin within a two-dimensional range/Doppler "processing window" of interest. Within that window, the range cell at which filtering is currently applied is referred to as the "test cell." Filters for all Doppler bins are determined and applied to the test cell data vector, the test cell is incremented, and the process is repeated for all cells within the processing window.

The neighborhood of range cells applied in determining the filter for a test cell "slides" with the test cell. The data vectors within this "sliding window" of range cells are referred to as "training data vectors" or "secondary data vectors." The interference component of the signal within the training data vectors ideally should be independent samples from distributions having the same, or nearly the same, spectral characteristics as that of the cell under test. Selecting training data from a sliding window increases the likelihood that the spectral characteristics of the interference in the training data are likely to match those of the test cell.

In Factored STAP, as it is defined here, first, the pulses associated with each subarray are passed through a Doppler filter. Spatial-only adaptivity then is applied to all corresponding resolution cell ("bin") outputs of the Doppler filters. It is essential that the adaptivity not precede the Doppler filtering and that the latter be heavily weighted for low sidelobes. This ordering and low sidelobe weighting is important because the clutter that must be suppressed by adaptivity then would principally originate from confined angular regions (portions of the "clutter ridge" intercepted by the Doppler mainlobe and, possibly, ambiguity lobes) and thus would be manageable with a small number of DOFs.

A "sliding window" reference data selection technique is common for post pulse compression STAP methods. STAP is applied to compressed pulse data, and reference data is derived from range cells within a sliding window centered about the test range cell. "Guard cells" immediately neighboring the test cell are excluded from the data set to minimize suppression of target signal within the adaptive process. For precompression STAP, a fixed window reference data selection technique is typical whereby the same weight vector is applied to all test cells.

Further, it would be evident to those skilled in the art that the method can be directly extended to any number of platforms flying in loose coordination. The MDV improves with the addition of platforms. For three or more platforms spaced randomly, the grating lobes degenerate to random high sidelobes with consequentially fewer and smaller blind velocity regions.

As embodied herein and depicted in FIG. 5, a block diagram of signal processing elements in accordance with the present invention when the relative platform locations and velocities are greater than a range cell and Doppler bin is disclosed. Here, the present invention is configured to determine the weights (w) when uncertainties in relative platform locations and or velocities are on the order of, or greater than, a range cell and/or Doppler bin. As explained above, the uncertainty will be limited to a small part of a range and Doppler bin if the constraints outlined at FIG. 2 are adhered to, namely: (1) the platforms move at roughly the same velocity in roughly the same direction during the CPI; (2) the cross range dimension ($\Delta Y$) is limited to a few wavelengths (e.g., 5-20$\lambda$); and (3) the potential target range is several times the platform altitude. With freedom to distance themselves along the remaining two dimensions, the aforementioned constraints are not burdensome.

As embodied herein and depicted in FIG. 5, a block diagram of signal processing elements in accordance with the present invention is disclosed. System 10 is configured to accommodate data signals from L platforms, wherein L is an integer value greater than or equal to two. Thus, data input channel 12-1 is configured to provide the data signal $S_1$ from platform 1, and data input channel 12-L is configured to provide the data signal $S_L$ from $L^{th}$ platform. The data signals ($S_1 \ldots S_L$) are provided to the Doppler filters 20 and the fast time delay taps 14, which comprise the non-adaptive processing portion of FIG. 5. Thus, the data signal $S_1$ is directed to a bank of Doppler filters $20_1$-1 and the data signals $S_2$ is directed to a bank of Doppler filters $20_2$-1 and at least one fast time delay tap 14 (The same is true for channels 3-L). The fast time delay tap 14 introduces about a one-half range cell time delay such that a time delayed version of signal $S_2$ is provided to a second bank of Doppler filters $20_2$-2. The same non-adaptive process is carried out on the remaining signals ($S_3$-$S_L$). Accordingly, the weight determination block 30 is extended by introducing the fast-time delay taps 14 and several adjacent Doppler bins for each weight determination.

In conventional STAP applications, a covariance matrix is generated from samples of the undesired interference signals, such as clutter and noise, and the weights w are calculated from the estimated covariance matrix and a steering vector in standard STAP fashion. The steering vector is typically matched to the target vector t (t denotes the vector of voltages at the channel ports due to the target signal) so that the resulting weight vector is that which provides the best compromise between clutter suppression and target signal to noise (SNR) enhancement. If the SNR is relatively large in one of the platform subsystems, the steering vector need not be matched to the target vector, and the need to track the relative positions and velocities of the platforms has been eliminated. This invention applies, therefore, to what is termed clutter limited scenarios. The clutter to noise power ratio (CNR) is large and the SNR is large. The data for obtaining the sample covariance matrix typically is obtained from range cells other than the cell under test for a target, as discussed earlier. To see this, recall that the STAP weights attempt to approximate w=$R^{-1}$s by estimating the interference plus noise covariance matrix R from the data. Note first that the matched filter signal power is proportional to:

$$T=\overline{|w^H t|^2} \quad (14)$$

Note also that the interference plus noise power is proportional to:

$$IN=w^H R w \quad (15)$$

The STAP weights w will yield the best compromise of increased signal to noise and decreased noise plus interference (in our example, clutter, although jamming and other such interference applies as well). For T to be maximized, however, w=s and s=t, but the elements of s that match those of t are limited to those corresponding to one platform only because of the unknown relative positions and velocities of the platforms. The minimal value of IN on the other hand is independent of t.

The multiplatform GMTI radar of the present invention is thus configured to detect ground moving targets with very small minimum detectable velocities, without requiring that the relative positions of the antenna phase centers be accurately tracked. For simplicity, consider two platforms with one channel on each platform. The clutter cancellation architecture of the radar can be thought of as a mainlobe canceller, with one radar functioning as main channel and the other as auxiliary (clutter cancellation) channel. The appropriate choice for steering vector s is unity for the main channel, and zeroes for the aux channels. Further, it would be evident to those skilled in the art that the method can be directly extended to any number of platforms flying in loose coordination. The MDV improves with the addition of platforms because the aperture size is increased. For three or more platforms spaced randomly, the grating lobes degenerate to random high sidelobes with consequentially fewer blind velocity regions. Further, the method described above can be implemented monostatically with a transmitter on one of the receive platforms, or bistatically with a transmitter on a remote platform.

Figure 6:
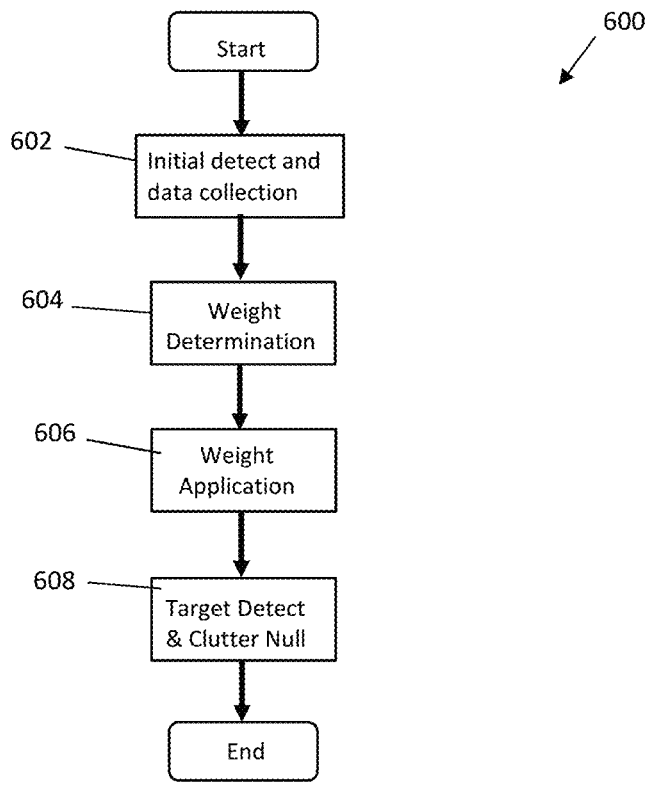
FIG. 6 is a chart illustrating a high level process flow in accordance with the present invention.

Referring to FIG. 6, a chart illustrating a high level process flow in accordance with the present invention is disclosed. The weights for the search volume are calculated from the interference voltages using equation (8) or its matrix equivalent given above. In step 606, the weights are applied by performing the standard STAP matrix calculations. The target detection step 608 was also described above.

Figure 7:
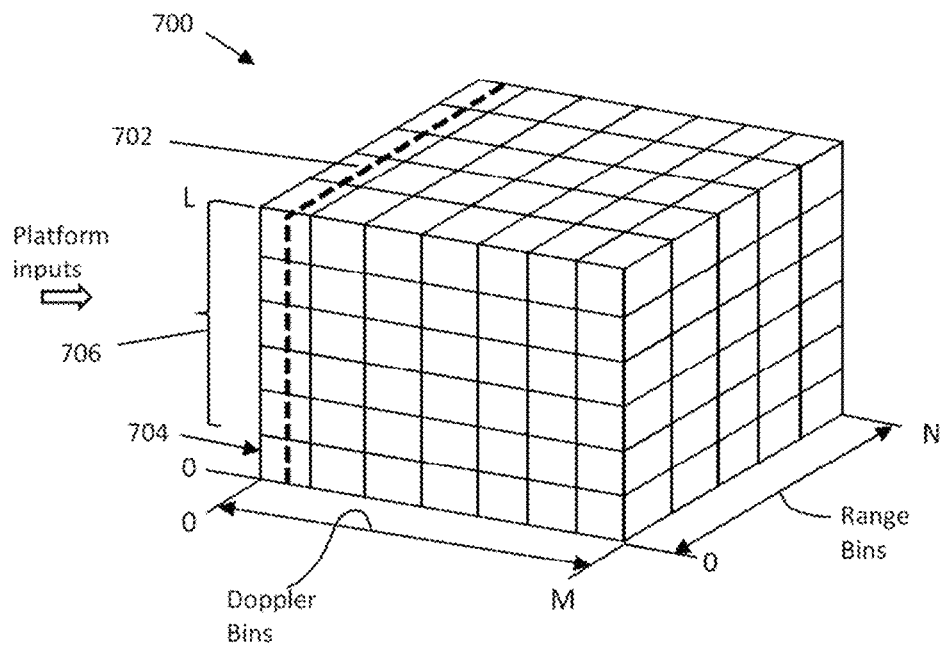
FIG. 7 is a detailed diagram illustrating the data applied in determining weight values depicted in FIGS. 5 and 6.

Referring to FIG. 7, a detailed diagram illustrating the step of determining weight values depicted in FIGS. 5 and 6 is disclosed. FIG. 7 shows a three-dimensional view 700 of the data obtained by all of the platforms during the CPI. As noted above, this data "cube" is extended by the non-adaptive processing elements (i.e., Doppler filters 20 and fast time taps 14) of system 10. See, FIG. 5. The vertical axis represents the inputs provided by the platforms (1-L). Segment 704 is provided by the main channel and segments 706 are provided by the auxiliary channels. The "Doppler Bins" axis is a measure of the M Doppler bins provided by the Doppler filter banks 20, M being an integer value. The remaining axis corresponds to the range of the signal returns for a single radar pulse transmission, i.e., each block represents a range bin. The section of the cube corresponding to dashed line 702 represents the first Doppler bin data for each of the L-platform inputs.

Figure 8:
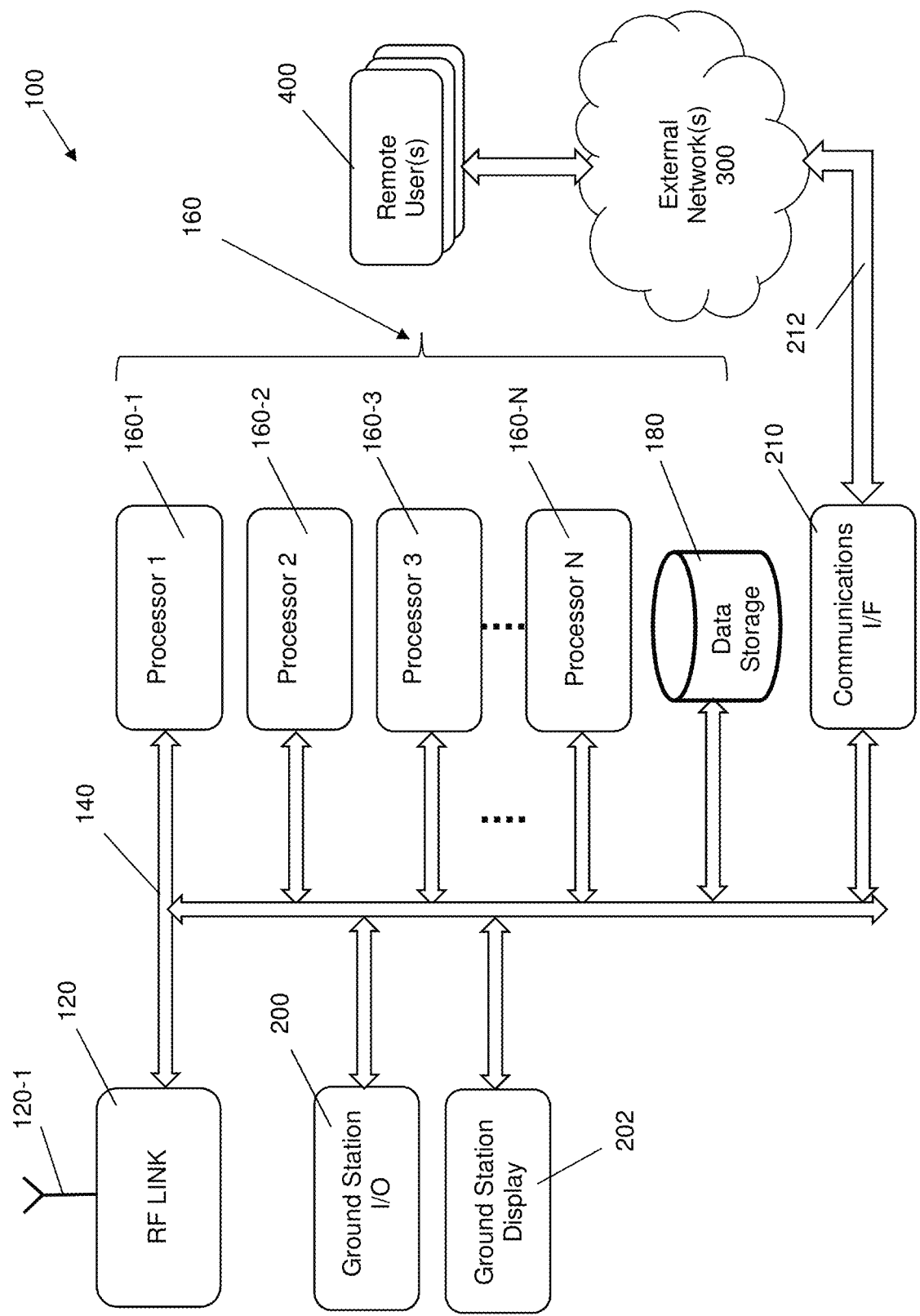
FIG. 8 is a block diagram illustrating an implementation of a remote processing system in accordance with an embodiment of the present invention.

As embodied herein and depicted in FIG. 8, a block diagram illustration an implementation of a remote processing system 100 in accordance with one embodiment of the present invention is disclosed. As shown by FIG. 7, the volume of data provided by L-platforms can become quite high as the integer L increases. (See, FIG. 5). The ground station 100 can include one or more RF data links 120 configured to communicate with the airborne GMTI platforms (1-L). The RF data links 12 propagate and receive RF data signals via one of more RF antenna(s) 120-1. The RF link equipment 12 is coupled to a parallel arrangement of processors 160 by a network fabric 140. The network fabric 140 also interconnects input/output (I/O) devices 200 and ground station display devices 202. The ground station 100 also includes one or more external communications links 210 that are configured to establish communications with remote users 400 via one or more external networks 300.

The ground station 100 may employ the parallel processor arrangement 160 to perform both the matrix weight determination (604) and the matrix weight application calculations (606) required to implement the feedback loop (See, FIG. 6). The parallel processor system 160 includes a primary processor 160-1 and N−1 processors (160-2-16-N), wherein N is an integer number of processors. As those of ordinary skill in the art will appreciate, the number N may need to be increased as the number of airborne or spaceborne platforms being supported by the system increases. Those of ordinary skill in the art will recognize that sizing processing requirements is within the skill of the ordinary artisan.

The primary processor 160-1 includes server software configured to control the processing and data transfer within the parallel arrangement. Moreover, the primary processor 160-1 is also coupled to a data storage arrangement 180 that comprises high speed disks or solid state drives configured to provide adequate data storage to accommodate the potentially large amount of data coming from the platforms.

As noted above, the parallel processor system 160 includes N tightly coupled processors (160-2 to 160-N) that are slaved to the primary processor 160-1 and are thus configured to operate as a single system that supports the intensive computing operations described herein. Processors 160-2 to 160-N provide processing resources on demand from the primary processor in order to calculate the weights and perform the space-time adaptive processing described above. Each processor 160-$n$ typically runs the same operating system, but may also run a different operating system. In this type of arrangement, a higher virtual layer may be required to ensure interoperability. In any event, the processors (160-1 to 160-N) are tied together and cohesively directed by a middleware layer (i.e., software) such that they operate together as a single machine.

In another embodiment of the present invention, many elements of the ground station 100 may be disposed in an airborne or spaceborne platform. In FIG. 2, for example, platform 1 may be equipped with a scaled-down version of the arrangement depicted in FIG. 8. For example, the parallel processing arrangement 160 may be implemented using parallel processing printed circuit boards disposed on a rack in the electronics bay. In yet another embodiment, the processing arrangement 160 may be implemented by an arrangement of field-programmable gate array devices (FPGAs) or application specific integrated circuits (ASICs).

The high speed digital network fabric 14 is configured to provide duplex data communications between nodes and may be implemented using any suitable means such as an Ethernet local area network, an InfiniBand fabric, etc. In any event, the digital fabric 14 may be configured to accommodate digital traffic at a rate exceeding 10 GB/s per second depending on the implementation.

The ground station 100 includes I/O devices 200-202 that enable tactical personnel to input data to the system and analyze output. Each operator and/or decision maker may be provided with a lap top or a desk top PC device wirelessly coupled to the system 10. Input devices may also include, inter alia, keyboards including alphanumeric and other keys for communicating information and command selections to the cluster 16. Other types of user input devices include cursor controls such as a mice, trackballs, or cursor direction keys for communicating directional information and command selections to control cursor movements on one or more display devices. With respect to output devices 202, personnel may be provided with output devices such as a cathode ray tube (CRT), liquid crystal display, active matrix display, or plasma display for displaying the current raw radar data, radar tracks or other pertinent tactical data. In a combat information center type setting, the ground station output 202 also may include a large display that allows operators and decision makers to view relevant information as a team. A display of this type could also provide planned position indicator (PPI) display of the GMTI radar data.

As described herein, the ground station 100 also includes one or more external communication interfaces 210 that allow it to provide remote locations and remote users with real time radar data and analysis. The communication interface may include hardware network access card(s) and/or driver software necessary for connecting the ground station to the external network fabric. The communications interface may be implemented using any suitable arrangement such as the public switched telephone network (PSTN), a digital subscriber line (DSL) card or modem, an integrated services digital network (ISDN) card, a cable modem, a telephone modem, or any other communication interface that provides a data communication connection to a corresponding type of communication line. The communication interface 210 may also interface a local area network (LAN) or a wide area network (WAN) using, e.g., Ethernet™ or Asynchronous Transfer Mode (ATM) cards that provide a data communication connections between the remote users 40 and the PC I/O devices 200-202. Communications interface 210 may also provide interconnections between PC I/O devices 200-202 and the global packet data communication network now commonly referred to as the Internet, or to data equipment operated by a network service provider. Wireless links can also be used to implement interface 210. In any such implementation, communication interface 210 may be configured to transmit and receive electrical, electromagnetic, or optical signals that carry digital data streams representing various types of information.

Further, the communication interface 210 can include peripheral interface devices, such as a Universal Serial Bus (USB) interface, a PCMCIA (Personal Computer Memory Card International Association) interface, etc. Although a single communication interface 210 is depicted in FIG. 8, multiple communication interfaces can also be employed.

The parallel processing arrangement 160 can be configured to send and receive data, including program code, through the fabric 140, the communications interface 210, and the network(s) 300. In the Internet example, a server (not shown) may transmit requested code belonging to an application program for implementing an embodiment of the present invention through the network 300, interface 210 and the fabric 140. The parallel processing arrangement 160 may execute the transmitted code while being received and/or store the code in the attached storage facility 180, or in other non-volatile storage for later execution.

The term "computer-readable medium" as used herein refers to any medium that participates in providing data and/or instructions to the processor for execution. Such a medium may take many forms, including but not limited to non-volatile media, volatile media, and transmission media. Non-volatile media include, for example, solid state devices, and optical or magnetic disks. Volatile media include dynamic memory devices. Transmission media may include coaxial cables, copper wire and fiber optic media. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

The term "processor" is used herein generally to describe various apparatus relating to the operation of one or more radar systems. A processor can be implemented in numerous ways (e.g., such as with dedicated hardware) to perform various functions discussed herein. A "processor" may employ one or more microprocessors that may be programmed using software (e.g., microcode) to perform various functions discussed herein. A processor may be implemented with or without employing a microprocessor, and also may be implemented as a combination of dedicated hardware to perform some functions and a processor (e.g., one or more programmed microprocessors and associated circuitry) to perform other functions. Examples of processor components that may be employed in various embodiments of the present disclosure include, but are not limited to, conventional microprocessors, reduced instruction set computers (RISC), application specific integrated circuits (ASICs), field-programmable gate arrays (FPGAs) and the like.

The term "network" as used herein refers to any interconnection of two or more devices that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user and operator and one or more devices that enable communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The airborne mobile (or spaceborne) platforms 1-L and the ground station 100 may communicate via an RF data link 120 that is used to transmit the radar data to the ground station 100. As those of ordinary skill in the art will appreciate, any suitable high speed duplex data link capable of digital data transfer at a sufficiently high data rate can be employed in the present invention. Examples include, but are not limited to, Link 1, Link 11, Link 11B, Link 16 and the like. A proprietary data link may also be used. The RF data link may be configured as a line of sight (LOS) data link, beyond-LOS link, a satellite data link, or by way of an aircraft data relay. While only one aircraft platforms (1, 2) are shown in FIG. 2, those of ordinary skill in the art will recognize that the ground facility 100 may be configured to accommodate traffic from one or many airborne or spaceborne platforms.

Figure 9:
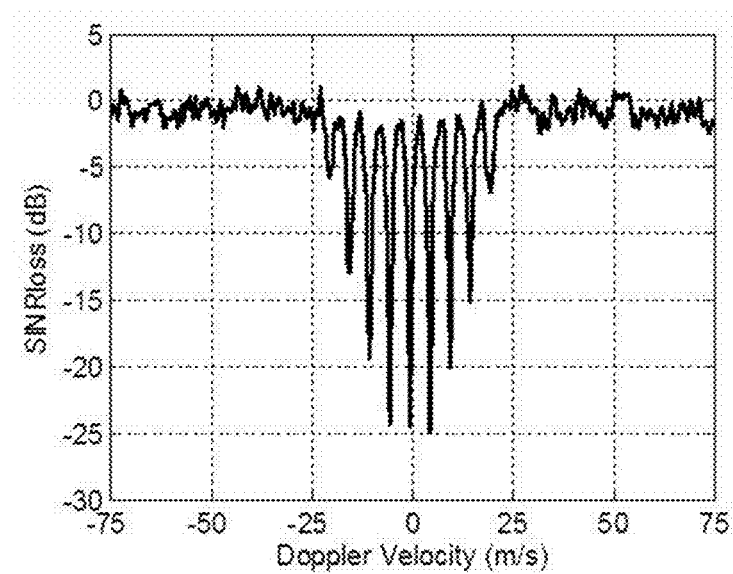
FIG. 9 is a chart showing the SINRloss for 256 Pulse CPI (with the steering vector matched to target vector)

Referring to FIG. 9, a chart showing the SINR Loss derived from a simulation of the present invention conducted by the inventors. A representative scenario was simulated to verify that the platforms need not be precisely tracked to achieve a small MDV by using the processing of this invention. The simulation modeled the two-channel radar scenario depicted in FIG. 2. Each channel was associated with one platform. Referring to FIG. 2, the platforms 1 and 2 moved with substantially identical velocities of 100 m/s. Each channel fed a four wavelength antenna. The antenna phase centers (hence, platforms) were separated by 20 wavelengths and were located on a line parallel to the velocity vector and normal to the target direction. The radar altitude was 15.8 km, and the slant range was about 30 km. In the simulation, the radar frequency was equal to 1 GHz and the sampling rate was 5 MHz. The linear frequency modulation (LFM) bandwidth equaled about 3.5 MHz. The pulse repetition frequency (PRF) was 1000 Hz, and the pulse width was about 6 μs.

As noted previously, in addition to the cross-range separation ($\Delta Y$), the platforms could have been offset along the down-range coordinate ($\Delta X$) or offset in altitude a modest amount to result in a more practical separation between platforms. This would not have significantly impacted the results of the simulation. See, e.g., FIG. 2.

The clutter was modeled as grazing-angle dependent Gaussian on a flat Earth. The azimuth beamwidth of each antenna was about 14 degrees with very low sidelobes. The transmit powers and noise figures were adjusted to result in about 25 dB of clutter-to-noise ratio. A proprietary simulation program (i.e., SRC's MIST simulator) was used to generate the data for processing. MIST is a computationally intensive physics-based simulation program that models clutter sources as tens of thousands of point scatterers. An entire "data cube" (as in FIG. 7) is generated by superimposing the clutter contributions to each range sample, channel, and pulse repetition interval (PRI). (The latter pulses were transformed to form the Doppler bins of FIG. 7.) Noise is added to each sample, as well. MIST modeling includes curved Earth and terrain dependent scattering, although these features were not applied here in deference to simplicity. A two-spatial channel, three-bin (three Doppler bin DOFs) post-Doppler STAP method was applied to the data. Ninety range cells were used in estimating covariance matrices. Because of forty-three percent (43%) oversampling, the number of independent range cells was about 58 or about ten times the number of DOFs.

Referring back to FIG. 9, the chart shows the SINR Loss with the steering vector matched to a broadside target for a 256-pulse CPI. (The SINR Loss is the signal to interference plus noise power ratio following STAP divided by the signal to noise power ratio with conventional pulse Doppler processing and with clutter absent.) In spite of the periodic blind zones, a very small minimum detectable velocity is evident with say a 5 dB loss threshold. The target spatial vector was $t=[1\ 1]^H$ (equal complex voltage in the two spatial channels).

Figure 10:
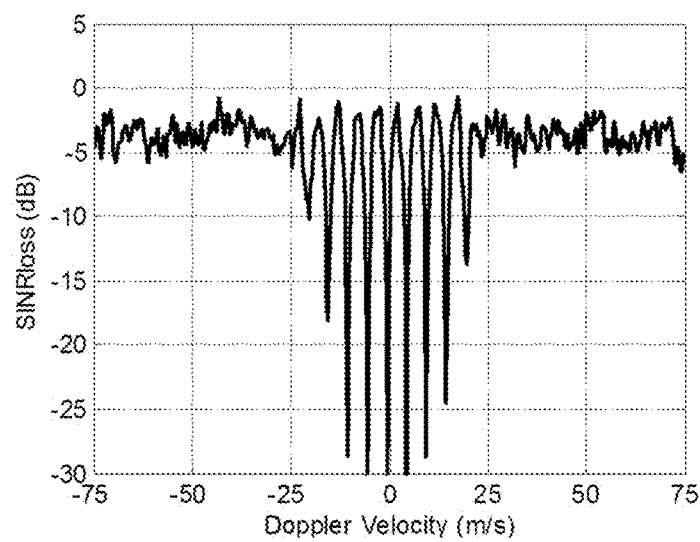
FIG. 10 is a chart showing the SINRloss for a predetermined steering vector in accordance with the present invention.

Referring to FIG. 10, a chart showing the SINRloss for a 256-pulse CPI with mismatched spatial steering vectors of $s=[1\ 0]^H$. Mainlobe clutter suppression is evident confirming that the target signal need not be known to a fraction of a wavelength for mainlobe clutter suppression. The apparent SINR Loss of ~3 dB in sidelobe clutter is a consequence of the mismatch between the target and steering vectors.

Figure 11:
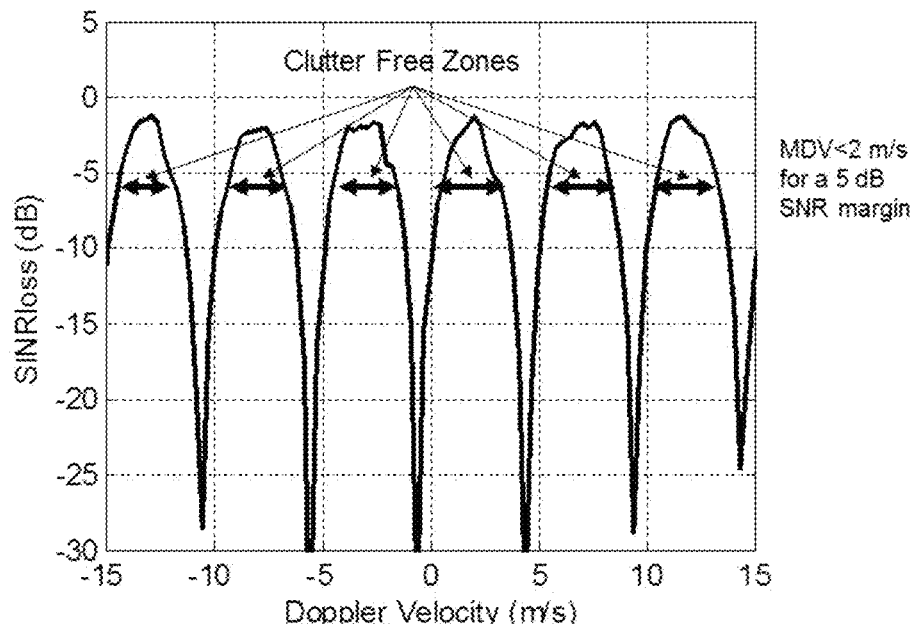
FIG. 11 is an expanded scale detail view of the chart of FIG. 7.

Referring to FIG. 11, an expanded scale detail view of the chart of FIG. 10 is disclosed. The STAP filter adaptively adjusts, in large part, to minimize clutter for targets competing with mainlobe clutter. The mainlobe clutter suppression is largely independent of steering vector. As shown herein the MDV is less than 2 m/s for a 5 dB SNR margin.

Figure 12:
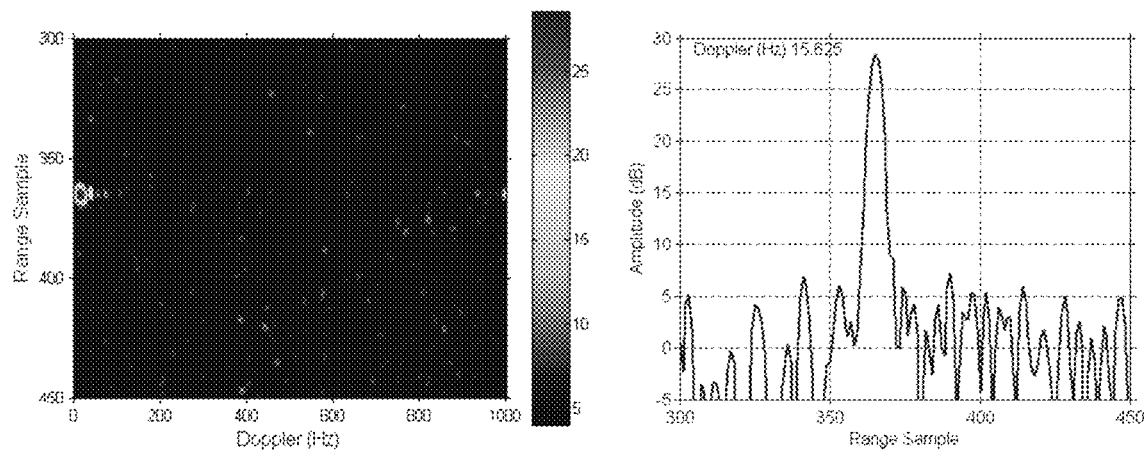
FIG. 12 is a range-Doppler response map for a multiplatform system that employs STAP processing.

FIG. 12 is a range-Doppler response map for a multi-platform system that employs adaptive processing similar to STAP. This result was obtained from a ground experiment with an interference source emulating a discrete clutter source. In this scenario, the excellent performance resulted from combining the channels adaptively to cancel the interference. The separation of the channel antennas was large, about 26$\lambda$. The frequency was 435 MHz. This experiment demonstrated that if detection is limited primarily by an external noise source (or, perhaps clutter in the moving platform case), rather than receiver noise, the channels need not be cohered to a fraction of a wavelength, but only to fractions of a range cell and a Doppler bin. Cohering occurs automatically as part of the adaptive processing because a precise steering vector is not required. Processing of the measured data with almost any spatial steering vector, in particular, "$[1\ 0]^H$", yielded SINR loss that varied by only about 0.1 dB or so. Data was delay matched but not phase matched. Adaptive filter weights, as determined from secondary data, automatically adjusted to cancel the interference. This was significant because it suggested that conventional navigational equipment alone would be adequate to synchronize the data. The implication was that super precise navigation and channel matching are not required, and there is no need for sub-wavelength phase center tracking, cohering on clutter spikes, or cohering with transponders.

In summary, the Multiplatform GMTI Radar of this invention is inexpensive to implement because the radar channels "automatically cohere." Super precise navigation of the platforms, to a fraction of a wavelength, is not required. The only additional hardware, beyond that normally available to the radars, is a data link between the platforms or from the platforms to a remote processor facility. Fast-time taps can be introduced in the STAP architecture to account for uncompensated differential time-delays, and additional Doppler taps can be introduced to account for uncompensated differential platform velocities. The potential payoff is about an order of magnitude reduction in MDV.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention. It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A radar system comprising:
   a data input portion including a first channel configured to receive first radar return samples from a first GMTI radar receiver disposed on a first mobile platform and at least one second channel configured to receive second radar return samples from at least one auxiliary GMTI radar receiver disposed on at least one second mobile platform, the first mobile platform and the at least one second mobile platform defining a distributed array, the first radar return samples and the second radar return samples corresponding to radar return signals originating from a radar transmitter;
   a non-adaptive processing portion coupled to the data input portion, the non-adaptive portion being configured to derive Doppler filtered radar return samples that include a plurality of first clutter signals from the first radar return samples, a plurality of second clutter signals from the second radar return samples and a target signal, the plurality of second clutter signals being characterized by at least one phase delay relative to the plurality of first clutter signals; and
   an adaptive processing portion coupled to the non-adaptive processing portion, the adaptive processing portion being configured to calculate a weight value as a function of the plurality of first clutter signals and the plurality of second clutter signals but not the phase delay, the weight value being employed in a weight vector w for a space-time adaptive processing (STAP) filter that applies the weight vector w to a signal vector corresponding to the Doppler filtered radar return samples the STAP filter implementing an open loop feedback configured to create beam pattern nulls at angles corresponding to a plurality of first interference signals within each of the Doppler bins without matching a steering vector to the target vector.

2. The system of claim 1, wherein the plurality of first clutter signals and the plurality of second clutter signals include clutter, noise or other interference signals.

3. The system of claim 1, wherein the plurality of first clutter signals and the plurality of second clutter signals substantially correspond to a predetermined range and predetermined Doppler frequency.

4. The system of claim 1, wherein the first mobile platform and the at least one second mobile platforms include an airborne platform or spaceborne platform.

5. The system of claim 1, wherein the at least one second airborne platform includes a plurality of second airborne platforms and the at least one auxiliary GMTI radar receiver includes a plurality of GMTI radar receivers.

6. The system of claim 1, wherein the first airborne platform and the at least one second airborne platforms are separated by a cross range dimension ($\Delta Y$) that is within a range of about 5-20 wavelengths ($\lambda$) of a transmitted radar signal.

7. The system of claim 1, wherein a potential target range is at least several times the altitude of the first airborne platform or the at least one second airborne platforms.

8. The system of claim 1, wherein a lateral separation dimension ($\Delta X$) and an altitude separation between the first airborne platform and the at least one second airborne platforms is substantially unconstrained.

9. The system of claim 1, wherein the data input portion is disposed on either the first platform or the at least one second platform.

10. The system of claim 7, wherein the non-adaptive processing portion and the adaptive processing portion are disposed at a location remote from the data input portion, and wherein the data input portion provides the first coherent radar return samples and the second radar return samples via a data link.

11. The system of claim 1, wherein the data input portion, the non-adaptive processing portion and the adaptive processing portion are disposed at a location remote from the first GMTI radar receiver or the at least one auxiliary GMTI radar receiver, and wherein the first coherent radar return samples and the second radar return samples are provided to the data input portion via a data link.

12. The system of claim 1, wherein the radar transmitter is configured as a monostatic radar transmitter or as a bistatic radar transmitter.

13. The system of claim 12, wherein the bistatic radar transmitter is disposed aboard a separate and remote airborne or spaceborne platform.

14. The system of claim 1, wherein the adaptive processing portion is configured to provide a clutter plus noise signal based on a linear combination of the plurality of first interference signals and a plurality of second interference signals.

15. The system of claim 1, wherein a linear combination of the first clutter signal and the second clutter signal is substantially equal to $y(\theta_c) = x_1(\theta_c) + w^* x_2(\theta_c)$, where $x_1(\theta_c)$ and $x_2(\theta_c)$ are the plurality of first clutter signals and the plurality of second clutter signals, respectively, and $\theta_c$ denotes the angle of a clutter direction vector relative to the distributed array boresight, and wherein $w^*$ is the complex conjugate of the weight vector w that maintains target signal strength while minimizing the mean square value of the clutter signal.

16. The system of claim 15, wherein a target signal in a linear combination of the first channel and the at least one second channel is given by:

$$y(\theta_t) = e_t f_1(\theta_t) + n_1 + w^*(e_t \exp(j\psi_t) f_2(\theta_t) + n_2),$$

wherein $e_t$ is a complex target spectral component, $f_1(\theta_t)$ and $f_2(\theta_t)$ are complex antenna patterns of the first GMTI radar receiver and the at least one second GMTI radar receiver, respectively, and wherein $e_t [\exp(j\psi_t)]$ is a complex target spectral component including the phase delay between the first GMTI radar receiver and the at least one second GMTI radar receiver, and wherein $n_1$ and $n_2$ are the first GMTI radar receiver noise and the at least one second GMTI radar receiver noise, respectively.

17. The system of claim 16, wherein the weight vector w is a mean square average given by: $w = -\overline{|x_1^*(\theta_c)|^2 / |x_2^*(\theta_c)|^2}$ wherein $x_1^*(\theta_c)$ and $x_2^*(\theta_c)$ are the complex conjugates of $x_1(\theta_c)$ and $x_2(\theta_c)$, respectively.

18. The system of claim 17, wherein the mean square average is approximated by collecting several range cells of the plurality of first clutter signals and the plurality of second clutter signals.

19. The system of claim 16, wherein the wherein the weight vector w is a covariance matrix given by:

$$w = R^{-1} s$$

where R denotes the interference plus noise covariance matrix and s denotes the steering vector that need not be matched to the target vector.

20. The system of claim 19, wherein the adaptive processing portion provides an output signal, the output signal being given by: $y = w^H x$ for a data vector x under test for a target.

21. The system of claim 1, wherein a relative position or a relative velocity of the first airborne platform or the at least one second airborne platform are known only to within a few range cells and Doppler bins from navigation data.

22. The system of claim 1, wherein the application of the weight vector w to a signal vector automatically coheres the plurality of first clutter signals and the plurality of second clutter signals to substantially cancel the plurality of first clutter signals and the plurality of second clutter signals and maintain the target signal strength.

23. A method for processing radar signals in a distributed array radar that includes a first GMTI radar receiver disposed on a first airborne platform, configured to receive first radar return samples and at least one auxiliary GMTI radar receiver disposed on at least one second airborne platform, configured to receive second radar return samples, the first airborne platform and the at least one second airborne platform defining a distributed array, the method including:
obtaining Doppler filtered radar return samples that include a plurality of first clutter signals from the first radar return samples, a plurality of second clutter signals from the second radar return samples and a target signal, the plurality of second clutter signals being characterized by at least one phase delay relative to the plurality of first clutter signals;
calculating a weight value as a function of the plurality of first clutter signals and the plurality of second clutter signals but not the phase delay, the weight value being employed in a weight vector w for a space-time adaptive processing (STAP) filter; and
applying the weight vector w to a signal vector corresponding to the Doppler filtered radar return samples; and
implementing an open loop feedback configured to create beam pattern nulls at angles corresponding to a plurality of first interference signals within each of the Doppler bins without matching a steering vector to the target vector.

24. The method of claim 23, further comprising:
identifying a target characterized by a target range and a target velocity relative to the first airborne platform and a target angle relative to the distributed array; and
receiving the first radar return samples from the first GMTI radar receiver and the second radar return samples from the at least one auxiliary GMTI radar receiver, the first radar return samples and the second radar return samples corresponding to radar return signals originating from one radar transmitter.

25. The method of claim 23, wherein the plurality of first clutter signals and the plurality of second clutter signals include clutter, noise or interference signals.

26. The method of claim 23, wherein the plurality of first clutter signals and the plurality of second clutter signals substantially correspond to a predetermined range and predetermined Doppler frequency.

27. The method of claim 23, wherein the radar transmitter is configured as a monostatic radar transmitter or as a bistatic radar transmitter.

28. The method of claim 23, wherein a clutter signal is provided based on a linear combination of the plurality of first interference signals and the plurality of second interference signals.

29. The method of claim 23, wherein the clutter signal is substantially equal to $y(\theta_c) = x_1(\theta_c) + w^* x_2(\theta_c)$, where $x_1(\theta_c)$ and $x_2(\theta_c)$ are the plurality of first clutter signals and the plurality of second clutter signals, respectively, and $\theta_c$ denotes the angle of a clutter direction vector relative to the distributed array boresight, and wherein $w^*$ is the complex conjugate of the weight vector w that maintains target signal strength while minimizing the mean square value of the clutter voltage.

30. The method of claim 28, wherein a target signal in a linear combining of the first channel and the at least one second channel is given by:

$$y(\theta_t) = e_t f_1(\theta_t) + n_1 + w^*(e_t \exp(j\psi_t) f_2(\theta_t) + n_2),$$

wherein $e_t$ is a complex target spectral component, $f_1(\theta_t)$ and $f_2(\theta_t)$ are complex antenna patterns of the first GMTI radar receiver and the at least one second GMTI radar receiver, respectively, and wherein $e_t [\exp(j\psi_t)]$ is a complex target spectral component including the phase delay between the first GMTI radar receiver and the at least one second GMTI radar receiver, and wherein $n_1$ and $n_2$ are the first GMTI radar receiver noise and the at least one second GMTI radar receiver noise, respectively.

31. The method of claim 29, wherein the weight vector w is a mean square average given by: $w = -\overline{|x_1^*(\theta_c)|^2 / |x_2^*(e_c)|^2}$ wherein $x_1^*(\theta_c)$ and $x_2^*(\theta_c)$ are the complex conjugates of $x_1(\theta_c)$ and $x_2(\theta_c)$, respectively.

32. The method of claim 30, wherein the mean square average is approximated by collecting several range cells of the plurality of first clutter signals and the plurality of second clutter signals.

33. The method of claim 29, wherein the weight vector w is a covariance matrix given by: $w = R^{-1}s$, where R denotes the interference plus noise covariance matrix and s the steering vector that need not be matched to the target vector.

34. The method of claim 29, further comprising the step of providing an output signal, the output signal being given by: $y = w^H x$ for a data vector x under test for a target.

35. The method of claim 23, wherein a relative position or a relative velocity of the first airborne platform or the at least one second airborne platform are known only to within a few range cells and Doppler bins from navigation data.

36. The method of claim 23, wherein the application of the weight vector w to a signal vector automatically coheres the plurality of first clutter signals and the plurality of second clutter signals to substantially cancel the plurality of first clutter signals and the plurality of second clutter signals and maintain the target signal strength.

* * * * *